United States Patent [19]

Cava et al.

[11] Patent Number: 4,542,083
[45] Date of Patent: Sep. 17, 1985

[54] NONAQUEOUS CELL USING MIXED METAL OXIDE POSITIVE ELECTRODE

[75] Inventors: Robert J. Cava, Millington; Donald W. Murphy, Warren, both of N.J.

[73] Assignee: AT&T Bell Laboratories, Murray Hill, N.J.

[21] Appl. No.: 618,777

[22] Filed: Jun. 11, 1984

Related U.S. Application Data

[63] Continuation of Ser. No. 383,820, Jun. 1, 1982, abandoned.

[51] Int. Cl.$^4$ .............................................. H01M 4/58
[52] U.S. Cl. ...................................... 429/218; 429/194
[58] Field of Search ................................ 429/218, 194

[56] References Cited

U.S. PATENT DOCUMENTS

| | | | |
|---|---|---|---|
| 3,410,731 | 11/1968 | Rightmire et al. | 429/218 |
| 3,655,585 | 4/1972 | Dey et al. | 252/506 |
| 4,132,619 | 1/1979 | Klein et al. | 429/218 |
| 4,198,476 | 4/1980 | Di Salvo, Jr. et al. | 429/194 |
| 4,228,226 | 10/1980 | Christian et al. | 429/194 |
| 4,233,375 | 11/1980 | Whittingham et al. | 429/218 |
| 4,310,609 | 1/1982 | Liang et al. | 429/218 |

OTHER PUBLICATIONS

Cava et al., "Lithium Insertion in Wadley-Roth Phases Based on Niobium Oxide", *Journal of the Electrochemical Society*, vol. 130, No. 12, 1983.

Hackh's Chemical Dictionary; Grant, Julius, ed.; 1972; New York et al.; McGraw-Hill Book Company; pp. 156–157, 455, 682–683.

C. R. Walk et al., *J. Electrochem. Soc.: Reviews and News*, "Li/V$_2$O$_5$ Secondary Cell," Mar. 1975, Abstract No. 27.

K. H. Cheng et al., "Lithium Incorporation in Tungsten Oxides," *Solid State Ionics*, vol. 1, 1980, pp. 151–161.

S. Launay-Mondet, *Revue de Chimie Minerale*, t. 8, 1971, pp. 391–422.

J. Darriet et al., "(W$_{0.2}$V$_{0.8}$)$_8$O$_7$: Synthese et Structure Cristalline," *Journal of Solid State Chemistry*, vol. 4, 1972, pp. 357–361.

*Primary Examiner*—Brian E. Hearn
*Assistant Examiner*—Stephen J. Kalafut
*Attorney, Agent, or Firm*—Richard D. Laumann

[57] ABSTRACT

It has been found that mixed metal oxides such as vanadium tungsten oxides or titanium niobium oxides, having the stoichiometry $xM^AO_2 \cdot Y_2^BO_5 \cdot zM^CO_3$ constitute useful active positive electrode material in nonaqueous cells.

14 Claims, 8 Drawing Figures

NONAQUEOUS CELL USING MIXED METAL OXIDE POSITIVE ELECTRODE

This application is a continuation of application Ser. No. 383,820, filed June 1, 1982, abandoned.

TECHNICAL FIELD

This invention relates generally to lithium cells and particularly to such cells having a nonaqueous electrolyte and a positive electrode comprising mixed metal oxides.

BACKGROUND OF THE INVENTION

There has been considerable interest in recent years in nonaqueous cells because of the possibilities they afford of obtaining cells which are especially useful for small electronic applications, for example, calculators, circuit boards, and watches, because of their desirable characteristics such as high energy and volume density. Such cells would also overcome some drawbacks, for example, the self discharge and relatively low voltage, of the presently widely used nickel-cadmium cells. Nonaqueous cells may be either primary, that is, they are manufactured in the charged state and undergo only discharge, or secondary, that is, they are capable of being recharged after discharge.

Many materials have been considered as candidates for the electrode materials in nonaqueous cells. The negative electrode typically comprises an alkali metal such as lithium or sodium although other materials have been considered. The positive electrode is selected from many classes of materials. Members of the class of materials that undergo topochemical reactions are potentially useful as the active positive electrode materials in secondary cells and have thus received particular attention. Topochemical reactions may be broadly defined as those reactions that involve a host lattice into which a guest species is inserted with the resulting structure maintaining the essential structural features of the host lattice. In many topochemical reactions, the structural changes are minimal and the process is termed intercalation. The intercalation process is likely to be readily reversible and may form the basis for a secondary cell if the reaction is of the oxidation-reduction type.

Topochemical reactions of alkali metals and several types of transition metal compounds are presently especially promising candidates for use in secondary cells. The use of the layered transition metal selenides and sulfides as the active positive electrode materials in such cells has received much attention. However, other factors being equal, the transition metal oxides are more desirable electrode materials than are the sulfides and selenides because they afford higher energy densities per unit weight and/or per unit volume. Additionally, the oxides are less noxious on decomposition than are the sulfides and selenides.

Several families of transition metal oxides have been studied for use as electrode materials. For example, $V_2O_5$ has been used in a primary cell by Dey et al. as disclosed in U.S. Pat. No. 3,655,585, as well as by Walk and Gore in *Electrochemical Society Meeting*, Paper No. 27, Toronto, May 11-16, 1975. However, these materials are not generally of great interest for use as electrode materials in secondary cells because they suffer from irreversible reduction at low potentials as well as electrolyte oxidation during charging. Vanadium oxides, including $VO_2(B)$ and those having the nominal stoichiometry $VO_{2+y}$, y greater than 0.0 and less than or equal to 0.4, have been used in secondary cells as described by Christian, DiSalvo, and Murphy in U.S. Pat. No. 4,228,226. These oxides have open and closely related shear structures which facilitate topochemical reactions with lithium. Several tungsten oxides have been shown to undergo topochemical lithium incorporation. See, for example, K. H. Chang and M. S. Whittingham, *Solid State Ionics*, 1, pp. 151-156 (1980). Transition metal oxides, such as $RuO_2$, $OsO_2$, $IrO_2$, $MoO_2$, $WO_2$ and $VO_2$, having the rutile structure have been used as the positive electrode material in secondary lithium cells by DiSalvo and Murphy as disclosed in U.S. Pat. No. 4,198,476.

SUMMARY OF THE INVENTION

According to the present invention, a nonaqueous cell uses at least one mixed metal oxide, such as vanadium tungsten oxides, having the nominal atom stoichiometry $xM^AO_2 \cdot yM^B_2O_5 \cdot zM^CO_3$, at least two of x, y, and z are nonzero, and $x+y+z=1.0$, at least two metals are present, as the positive electrode materials with lithium being used as the negative electrode material. In one preferred embodiment, $M^A$ is at least one element selected from Groups IVB, VB and VIB of the Periodic Table, $M^B$ is at least one element selected from the group consisting of the elements of Groups VB and VIB of the Periodic Table, and $M^C$ is at least one element selected from Group VIB of the Periodic Table. In another preferred embodiment, $M^A$ and $M^B$ are V and $M^C$ is W. In a further preferred embodiment, the active positive electrode material has the nominal atom stoichiometry $V_{2+\delta}W_{1-\delta}O_{7.5}$ where $\delta$ is greater than or equal to 0.0 and less than or equal to 0.2. These limits may also be expressed as follows: For $\delta=0.0$, $x=0.4$, $y=0.2$, and $z=0.4$; for $\delta=0.2$, $x=0.348$, $y=0.304$, and $z=0.348$. In yet another preferred embodiment, the active positive electrode material has the nominal atom stoichiometry, $W_{0.6}V_{2.4}O_7$ for which $x=0.615$, $y=0.154$ and $z=0.231$. In still another preferred embodiment, $M^B$ is Nb and $M^A$ is Ti. In further preferred embodiments, x is between 0.05 and 0.5, y is between 0.5 and 0.95, and z is 0.0.

The included compositions encompass a series of closely related shear structures found between the limiting stoichiometries $(M^A)O_2$ and $(M^C)O_3$. These shear structures have an open framework with tunnels and vacant sites available for lithium transport and coordination.

For reasons of clarity, the elements of the cell structure are not shown to scale.

DETAILED DESCRIPTION

Figure 1:
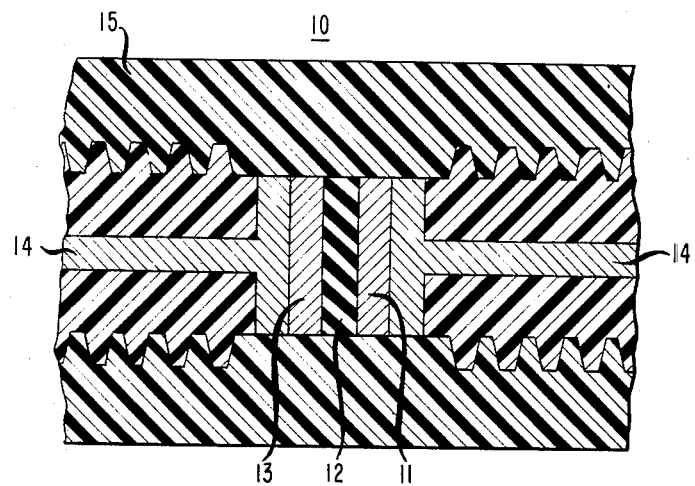
FIG. 1 is a side view of a nonaqueous cell according to this invention having a negative electrode and a positive electrode.
Figure 2:
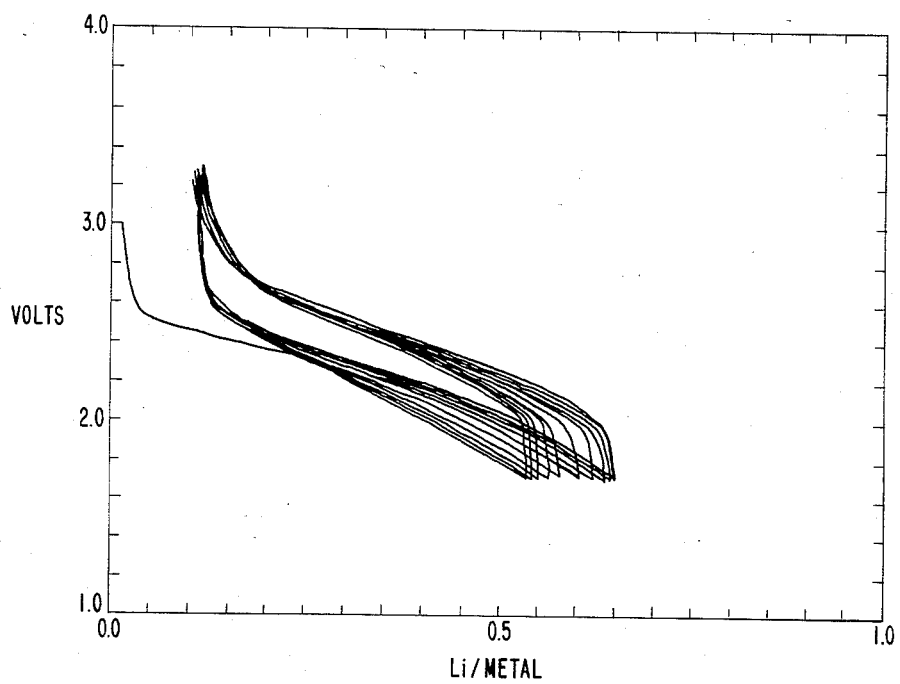
FIG. 2 shows the cell voltage, as a function of lithium content, for a cell having $WV_2O_{7.5}$ as the active positive electrode material.
Figure 3:
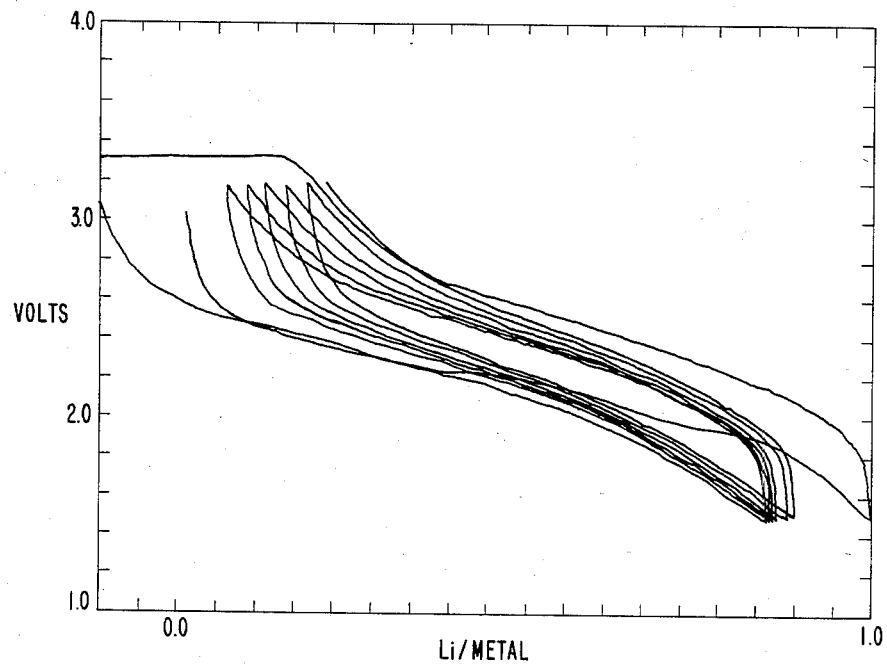
FIG. 3 shows the cell voltage, as a function of lithium content, for a cell having $W_{0.8}V_{2.2}O_{7.5}$ as the active positive electrode material.
Figure 4:
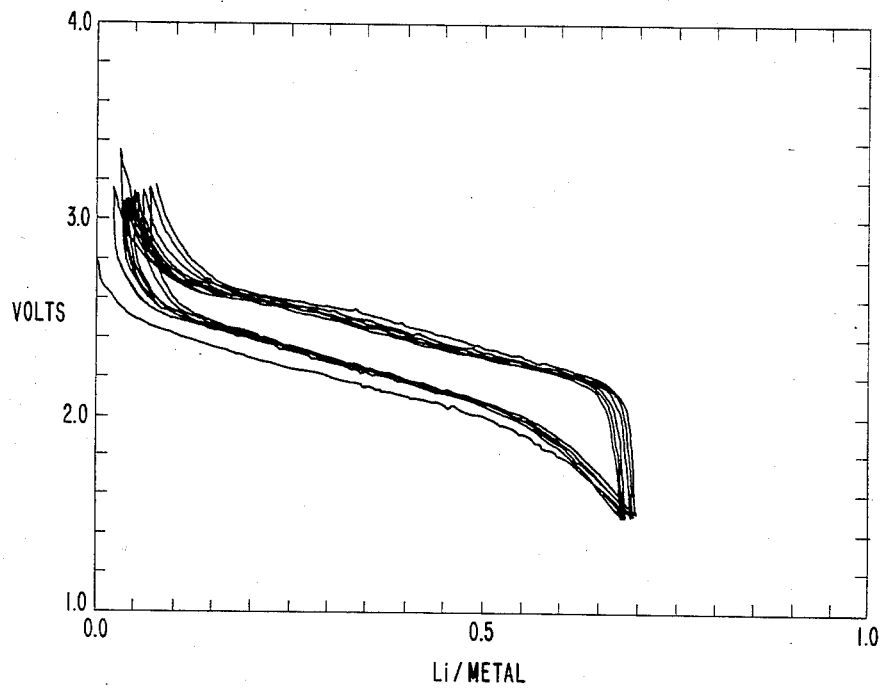
FIG. 4 shows the cell voltage, as a function of lithium content, for a cell having $W_{0.6}V_{2.4}O_7$ as the active positive electrode material.
Figure 5:
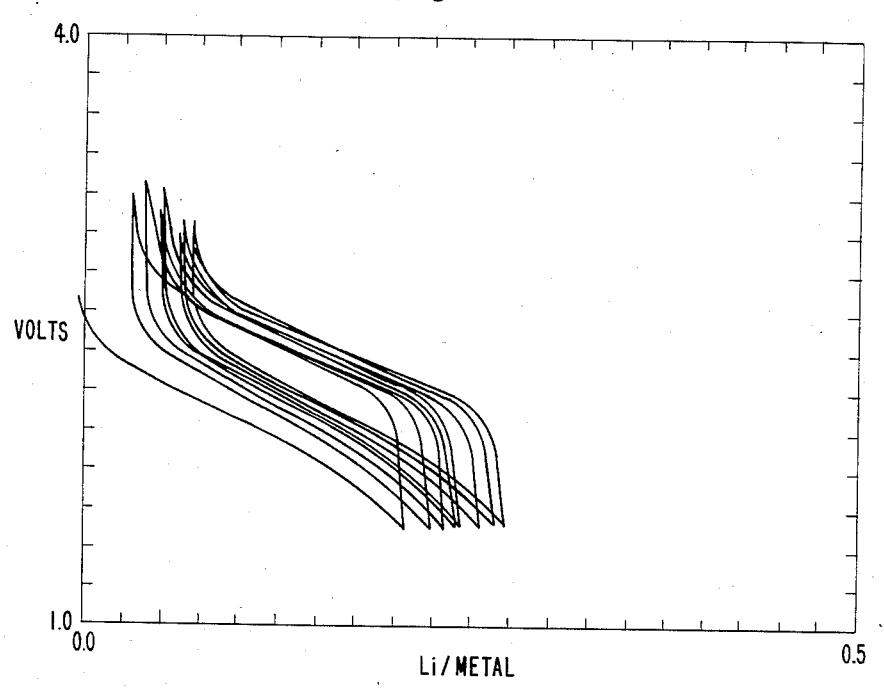
FIG. 5 shows the cell voltage, as a function of lithium content, for a cell having $WV_2O_7$ as the active positive electrode material.
Figure 6:
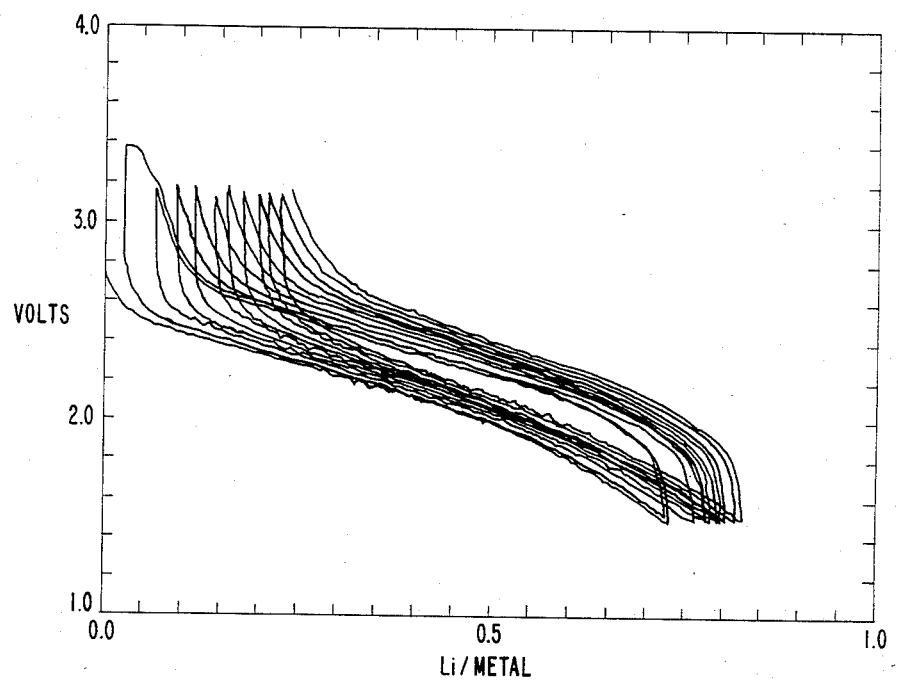
FIG. 6 shows the cell voltage, as a function of lithium content, for a cell having $WV_2O_{7.3}$ as the active positive electrode material.

FIG. 1 is a side view of a cell structure 10 with a negative electrode 11 comprising lithium, separator 12 impregnated with an electrolyte and a positive electrode 13. Also shown are current collectors 14, on both sides of the electrodes, and the surrounding structure 15 which is usually made of an inert, nonconducting material. The cell may be constructed by well-known techniques that need not be described in detail.

The cells of this invention may be constructed by any of the well-known and conventional methods in which the positive electrode comprising mixed metal oxides, such as vanadium tungsten oxides or titanium niobium oxides, as the active material is spaced from the suitable negative electrode with both electrodes in mutual contact with an electrically conductive nonaqueous electrolyte. The electrolyte is desirably nonreactive with both positive and negative electrode materials. Suitable electrolytes include lithium hexafluoroarsenate or perchlorate in propylene carbonate and lithium tetramethylboron in dioxalane. The current collectors contact both the positive electrode and the negative electrode and permit an electrical current to be drawn by an external circuit (not shown).

The cells may be manufactured in either the charged or discharged state. If manufactured in the charged state, the mixed metal oxide, such as vanadium tungsten oxide, may be prepared as described below and used directly as the positive electrode materials. If the cell is prepared in the discharged state, lithiated mixed metal oxides, such as vanadium tungsten oxides or titanium niobium oxides may be used as the positive electrode material. It is desirable that the conductivity of the positive electrode be sufficient at all states of charge to minimize dissipative losses. In general, to obtain the desirable conductivity of the mixed metal oxide positive electrode, an electrically conducting but chemically nonreactive material, such as graphite, is added to the positive electrode.

Other cell structures, such as one having thin film electrodes, may also be constructed. A cell with thin film electrodes may be assembled in several ways. For example, the various sheets forming the electrodes and separator may be placed together to form a rectangular battery or may be rolled together to form a cylinder.

The positive electrode comprises, as the active electrode material, the metal oxides, such as vanadium tungsten oxides and niobium titanium oxides, represented by the nominal atom composition $xM^AO_2 \cdot yM_2^BO_5 \cdot zM^CO_3$, at least two of x, y, and z are nonzero, and $x+y+z=1.0$; and at least two metals are present. In one preferred embodiment, $M^A$ is at least one element selected from Groups IVB, VB and VIB of the Periodic Table, $M^B$ is at least one element selected from the group consisting of the elements of Groups VB and VIB of the Periodic Table, and $M^C$ is at least one element selected from Group VIB of the Periodic Table. The term Group IVB means Ti, Zr and Hf. The term Group VB means V, Nb, and Ta. The term Group VIB means Cr, Mo and W. In one preferred embodiment, $M^A$ and $M^B$ are V and $M^C$ is W. In yet another preferred embodiment, $M^B$ is Nb and $M^A$ is Ti. It is to be understood that more than one oxide may be present as active positive electrode material.

Use of the above formula, namely $xM^AO_2 \cdot yM_2^BO_5 \cdot zM^CO_3$, yields compositions having fractional atoms. Chemical compositions are normally written in terms of integer or half integer atoms. Accordingly, the description of most compositions will be in terms of compositions having integer or half integer atoms.

The compounds within the included composition region have open framework structures with both tunnels and vacant sites which are suitable for lithium transport and coordination, respectively. These compounds encompass a series of closely-related shear structures formed between the limiting atom compositions $MO_2$ and $MO_3$. The active positive electrode material includes at least one of the mixed metal oxides, such as vanadium tungsten oxides or titanium niobium oxides, within the specified composition range. As the oxygen content increases from 2 to 3, the number of sites available for lithium increases. However, if too much oxygen is included, there is not enough edge sharing between octahedra for stability. In other words, as the oxygen content decreases from 3, edge sharing between octahedra, and thus stability, increases. If necessary or desired, the electrical conductivity of the positive electrode may be increased by intimately mixing an electrically-conducting material, such as graphite, with the active positive electrode material.

Several methods for preparing the included vanadium tungsten oxide compositions are well known to those in the art and have been reported in the literature. See, for example, *Revue de Chimie Minerale*, 8, pp. 391–422, 1971, or *Journal of Solid State Chemistry*, 4, pp. 357–361, 1972. These methods may be briefly described. One method involves the reaction of the appropriate mixtures of powders of $V_2O_5$ and $VO_2$ and/or V metal with $WO_3$ and/or W metal at temperatures below 700 degrees C. in a sealed, evacuated quartz tube.

In a second method, $VO_2$, $V_2O_5$ and $WO_3$ powders are intimately mixed and heated in platinum or alumina boats under a dynamic vacuum. The phase obtained depends on the tungsten/vanadium ratio of the starting mixture and the temperature of the treatment. From a mixture of $0.67VO_2$ and $0.33WO_3$ heated at 800 degrees C., for instance, the compound $WV_2O_7$ is formed.

The compound $V_{2+\delta}W_{1-\delta}O_{7.5}$ is prepared most easily in the preferred (M)—$Nb_2O_5$ structure as follows. Well-powdered $VO_2$, $V_2O_5$, and $WO_3$ are weighed out in the mole portions previously described and mixed intimately. The powder is then heated at approximately 650 degrees C. in vacuo, in a sealed quartz tube, for approximately 16 hours, removed from the tube and then pulverized. The reaction is generally complete after two such cycles or with longer heating times with no intermediate grinding. The same procedure will most easily produce $W_{0.6}V_{2.4}O_7$ in its preferred structure. Compounds with metals in their highest oxidation states can generally be easily synthesized without encapsulation. $TiNb_2O_7$, $Ti_2Nb_{10}O_{29}$ and $TiNb_{24}O_{62}$, for example, can be synthesized by heating in air at temperatures between 1200 and 1300 degrees C. Analogous procedures which will be easily ascertained by those skilled in the art may be used to prepare the other mixed metal oxides useful in cells of this invention.

Lithiated vanadium tungsten oxides, as well as the other oxides useful in cells of this invention, may be prepared chemically by treatment of the compounds with n-butyllithium in hexane. The X-ray powder diffraction patterns of these lithiated compounds are similar to those of the unlithiated compounds and indicate that the mixed metal oxide structures have not been severely distorted during the insertion reactions. This is evidenced by the crystallographic unit cell parameters obtained from these patterns. For example, for $V_2WO_{7.5}$ and $Li_{3.5}V_2WO_{7.5}$, the crystallographic unit cells have tetragonal symmetry and are comparable:

$V_2WO_{7.5}$; $a_0=19.50$; $c_0=3.70$.

$Li_{3.5}V_2WO_{7.5}$; $a_0=20.016(5)$; $c_0=4.059(4)$.

It is believed that compounds within the included range are desirably used in nonaqueous cells because of their crystal structures and the chemical properties of their constituent cations. The structures with $M^A$ and $M^B$ being V and $M^C$ being W may be briefly described as follows. The structures with other constituent cations may be similarly described. The basic building blocks of the structure are distorted $MO_6$ octahedra with vanadium or tungsten atoms near the center and surrounded by 6 oxygen atoms. In the prototype compound having the stoichiometry $MO_3$, $ReO_3$, the octahedra share only corners with the 6 neighboring octahedra. This structure is suitably open and has been found to undergo lithium insertion reactions to a stoichiometry $Li_2ReO_3$. However, the structure undergoes severe twisting at the octahedra corners and closes in on itself during the process. At metal to oxygen ratios greater than 1 to 3, the octahedra can no longer exclusively share corners, and an increasing number of edge shared octahedra are introduced as the stoichiometry is varied from $MO_3$ to $MO_2$. Compounds within the stoichiometry range between $MO_3$ and $MO_2$ mix corner and edge shared octahedra and still display open tunnel-like regions in their structures which are generally bound by regions of extensive edge sharing. If a sufficient amount of edge sharing is introduced, the structures become rigid against the twisting distortions observed in lithium inserted $ReO_3$, and no longer close in on themselves. Thus, the structures remain opened on lithium insertion and the diffusion of the lithium ions is not hindered.

The class of compounds of the type described within the stoichiometry range between $MO_2$ and $MO_3$ are known as Wadsley phases and display a wide range of ratios and geometries of edge and corner shared $MO_6$ octahedra. Wadsley phases are characterized by structures consisting of blocks of $MO_6$ octahedra sharing corners which are joined to adjacent blocks either through edge sharing or a combination of edge sharing and tetrahedrally coordinated metal atoms at the corners of the blocks. The blocks are infinite in one dimension and thus the structures can be considered as being built of $n \times m \times \infty$ $ReO_3$ type blocks where n and m are the numbers of octahedra along the length and width of the blocks, respectively. Structures with n and m between 2 and 5 have been observed and some contain more than one type of block. Wadsley phases occur extensively in, for example, the chemical systems $Nb_2O_5$—$WO_3$, $Nb_2O_5$—$NbO_2$, $Nb_2O_5$—$TiO_2$ and $Nb_2O_5$—$NbO_2F$. Vacant oxygen or fluorine positions are energetically unfavorable and small differences in stoichiometry result in different amounts of edge sharing and consequently, many distinct, albeit similar, crystal structures are observed. Furthermore, different phases can be formed at the same stoichiometry through differences in chemical and/or thermal synthesis conditions.

Compounds of the Wadsley phase type have stoichiometries that are presently described by the formula $M_{nmp+1}O_{3nmp-(n+m)p+4}$ where n and m define the block size and p is the number of blocks at one level joined by edge sharing. Compounds with stoichiometries of different description, depending on the mode of edge sharing, may also exist.

Nonaqueous electrochemical cells employing these compounds as the active positive electrode and lithium metal as the active negative electrode yielded open circuit cell potentials within the range from 2.6 to 2.8 volts. The cell voltage, as a function of lithium content is shown in FIGS. 2-6 for cells having $WV_2O_{7.5}$, $W_{0.8}V_{2.2}O_{7.5}$, $W_{0.6}V_{2.4}O_7$, $WV_2O_7$ and $WV_2O_{7.3}$, respectively, as the active positive electrode material in amounts of 10.15, 7.65, 6.0, 7.1 and 7.9 mg, respectively. For the first, second, fourth and fifth cells, x is between 0.34 and 0.4, y is between 0.2 and 0.31, and z is between 0.34 and 0.4. For the third cell, $x=0.62$, $y=0.15$, and $z=0.23$. The electrode material in the second, third and fifth cells comprised a mixture of phases. The cells were cycled at 20 mA. The electrolyte was $LiAsF_6$ in propylene carbonate and the positive electrode, in addition to the active material, comprised 50 percent, by weight, graphite. No self discharge was observed over a period of several weeks. These values of x, y, and z define preferred ranges of values. However, the values are approximate.

The vanadium tungsten oxides within the included compositions present a good combination of favorable structural and chemical properties. Although niobium containing compounds are useful, vanadium is easier to reduce during lithium insertion and thus appears to be the preferred constituent from this point of view. However, titanium-niobium compounds appear easier to fabricate. The addition of tungsten to the vanadium oxides apparently stabilizes the Wadsley phase type structures. The compound $V_{2+\delta}W_{1-\delta}O_{7.5}$, for example, can be synthesized in the $4 \times 4 \times \infty$ (M)—$Nb_2O_5$ Wadsley type structure. There are four chemical compositions known to form specific compounds within the stoichiometry range in the tungsten-vanadium system. These are at the compositions $V_{2+\delta}W_{1-\delta}O_{7.5}$ ($x=0.348$–$0.400$, $y=0.200$–$0.304$, $z=0.348$–$0.400$), $V_{2.4}W_{0.6}O_7$ ($x=0.615$, $y=0.154$, $z=0.231$), $V_2WO_{7.3}$ and $V_2WO_7$. Two distinct compounds are known to form at the $V_{2+\delta}W_{1-\delta}O_{7.5}$ composition depending on the temperature of synthesis. The form preferred in the nonaqueous lithium electrochemical cells is formed at temperatures less than 800 degrees C. and has the (M)—$Nb_2O_5$, $4 \times 4 \times \infty$ Wadsley phase structure.

Twelve structurally and/or chemically distinct Wadsley type phases were prepared in the range between $MO_{2.3}$ and $MO_{2.7}$ with M being mixtures of metals, as previously specified, from Groups IVB, VB and VIB of the Periodic Table. Lithium inserted compounds having a stoichiometry $Li_yMO_{2.3-2.7}$ were synthesized chemically by treatment of the oxide with n-butyllithium in hexane. Values of $\gamma$ between 0.5 and 1.1 were obtained at room temperature. In all cases, the lithium could be removed by chemical reaction with iodine in acetonitrile, leaving the original oxide phase unaltered. The results indicated that little edge sharing was necessary to stabilize the structures against twisting on lithium insertion. The compound with the largest block size, $5 \times 5 \times \infty$, $W_8Nb_{18}O_{69}$, ($MO_{2.633}$), (x=0.0, y=0.529, z=0.471), for example, reacted reversibly with n-butyllithium to a stoichiometry of $Li_{22}W_8Nb_{18}O_{69}$, $\gamma=0.85$.

Figure 7:
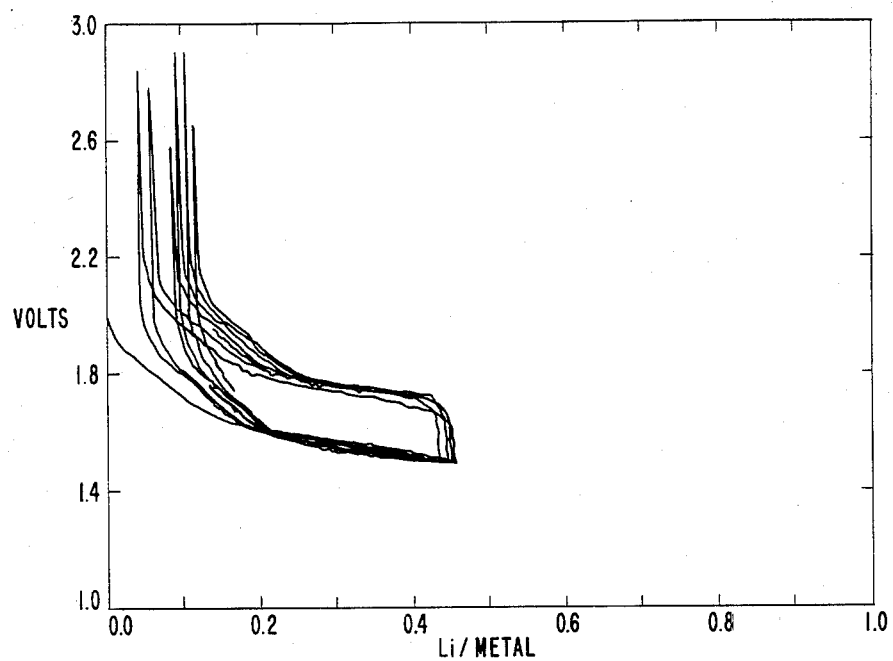
FIG. 7 shows the cell voltage, as a function of lithium content, for a cell having $Ti_2Nb_{10}O_{29}$ as the active positive electrode material.
Figure 8:
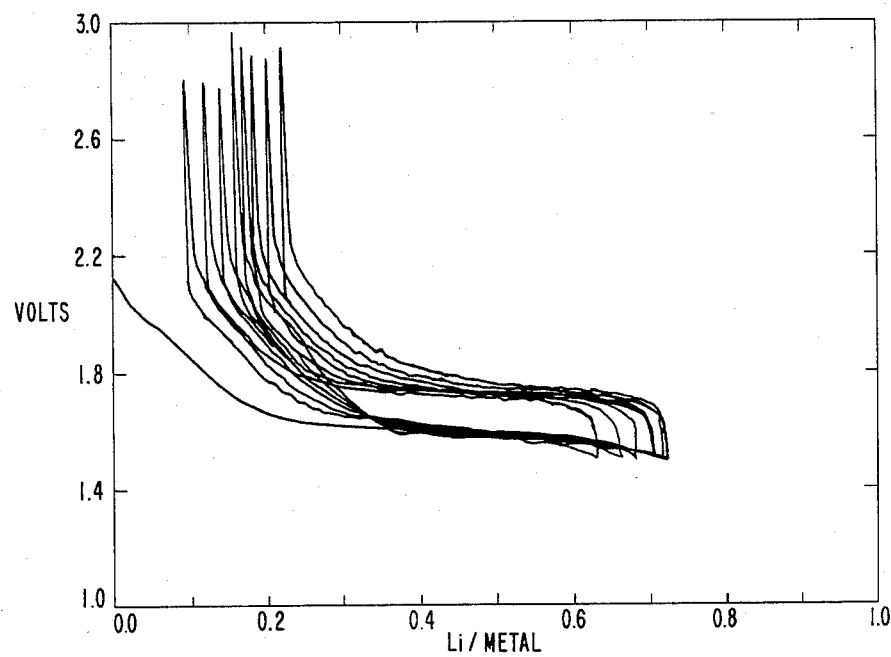
FIG. 8 shows the cell voltage, as a function of lithium content, for a cell having $TiNb_{24}O_{62}$ as the active positive electrode material.

The cell voltage, as a function of lithium content is shown in FIGS. 7 and 8 for cells having 6.95 mg of $TiNb_{24}O_{62}$ (x=0.077, y=0.927, z=0.0) and 7.8 mg of $Ti_2Nb_{10}O_{29}$ (x=0.286, y=0.714, z=0.0), respectively, as the active material. Additionally, a cell having $TiNb_2O_{10}$ (x=0.5, y=0.5, z=0.0), as the active positive electrode material had good characteristics. The electrolyte was lithium perchlorate in propylene carbonate and the positive electrode, in addition to the active material comprised 50 percent, by weight, graphite.

What is claimed is:

1. A nonaqueous cell comprising a negative electrode, an electrolyte and a positive electrode, said positive electrode active material comprising material of at least one Wadsley phase having the nominal atom composition $xM^AO_2 \cdot yM_2^BO_5 \cdot zM^CO_3$, at least two of x, y, and z are nonzero, $x+y+z=1.0$ and at least two metal elements M are present, wherein $M^A$ is at least one element selected from the group consisting of the elements of Groups IVB, VB and VIB of the periodic table, $M^B$ is at least one element selected from the group consisting of the elements of Groups VB and VIB of the periodic table, and $M^C$ is at least one element selected from the group consisting of the elements of group VIB of the periodic table.

2. A cell as recited in claim 1 in which at least one of $M^A$ and $M^B$ is a Group VB element.

3. A cell as recited in claim 2 in which said Group VB element is V.

4. A cell as recited in claim 3 in which $M^C$ is W.

5. A cell as recited in claim 4 in which x is within the range from approximately 0.3 to approximately 0.6.

6. A cell as recited in claim 5 in which y is within the range from approximately 0.15 to approximately 0.3.

7. A cell as recited in claim 6 in which z is within the range from approximately 0.2 to approximately 0.4.

8. A cell as recited in claim 4 in which x is approximately 0.62, y is approximately 0.15, and z is approximately 0.23.

9. A cell as recited in claim 1 in which $M^B$ is a Group VB element.

10. A cell as recited in claim 9 in which said Group VIB element is Nb.

11. A cell as recited in claim 10 in which $M^A$ is a Group IVB element.

12. A cell as recited in claim 11 in which said Group IVB element is Ti.

13. A cell as recited in claim 12 in which z is approximately 0.0.

14. A cell as recited in claim 13 in which x is between approximately 0.10 and 0.50 and y is between approximately 0.5 and 0.92.

* * * * *